May 14, 1968 R. BREHER 3,382,747
MACHINE FOR PRODUCTION OF RINGS OR DISCS FROM TUBE
OR STRAND-SHAPED WORKPIECES
Filed April 12, 1966 2 Sheets-Sheet 1

Inventor:
Rudolf Breher
By
Watson, Cole, Grindle & Watson
Attys.

May 14, 1968          R. BREHER          3,382,747
MACHINE FOR PRODUCTION OF RINGS OR DISCS FROM TUBE
OR STRAND-SHAPED WORKPIECES
Filed April 12, 1966          2 Sheets-Sheet 2
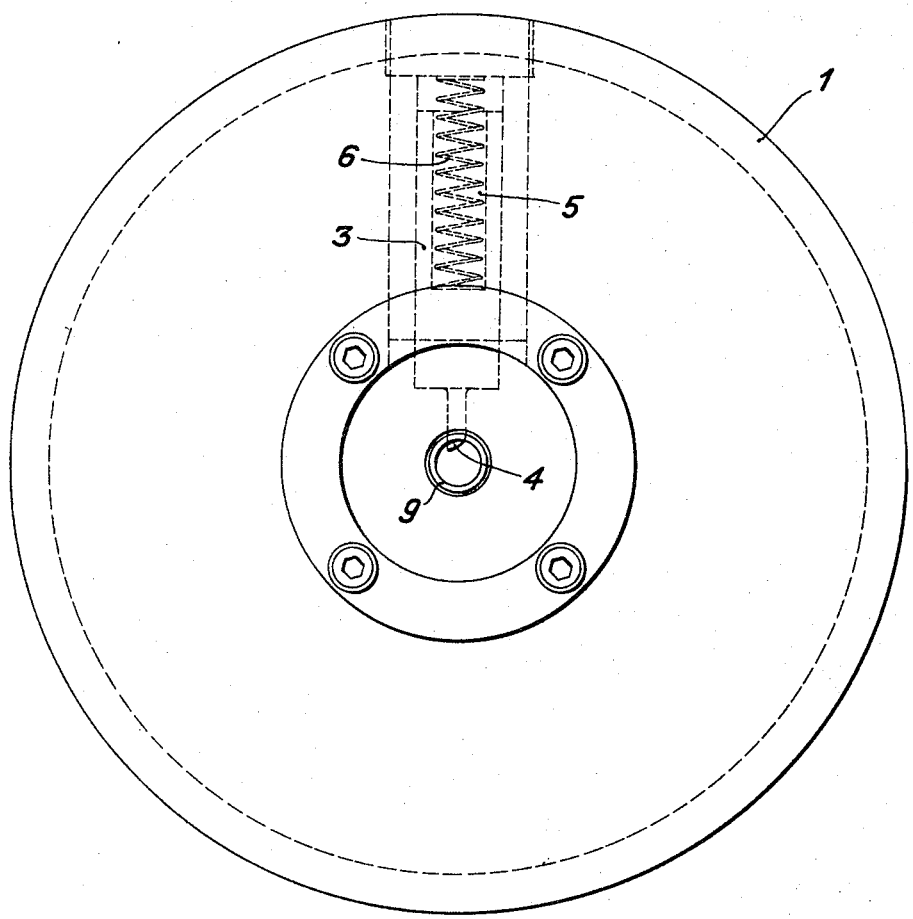

United States Patent Office 3,382,747
Patented May 14, 1968

3,382,747
MACHINE FOR PRODUCTION OF RINGS OR DISCS FROM TUBE OR STRAND-SHAPED WORKPIECES
Rudolf Breher, Uffeln, Vlotho, Germany, assignor to Firma Elastomer AG
Filed Apr. 12, 1966, Ser. No. 542,026
Claims priority, application Germany, Apr. 13, 1965, B 81,426
5 Claims. (Cl. 82—59)

ABSTRACT OF THE DISCLOSURE

The invention relates to a cut-off machine having a hollow rotating cutter head in which cutting elements are resiliently biased radially inwardly for cut-off operations during slow speed rotation and the cutting elements are retracted radially outwardly against the resilient bias during high speed rotation to permit intermittent axial advancement of work material.

---

Figure 1:
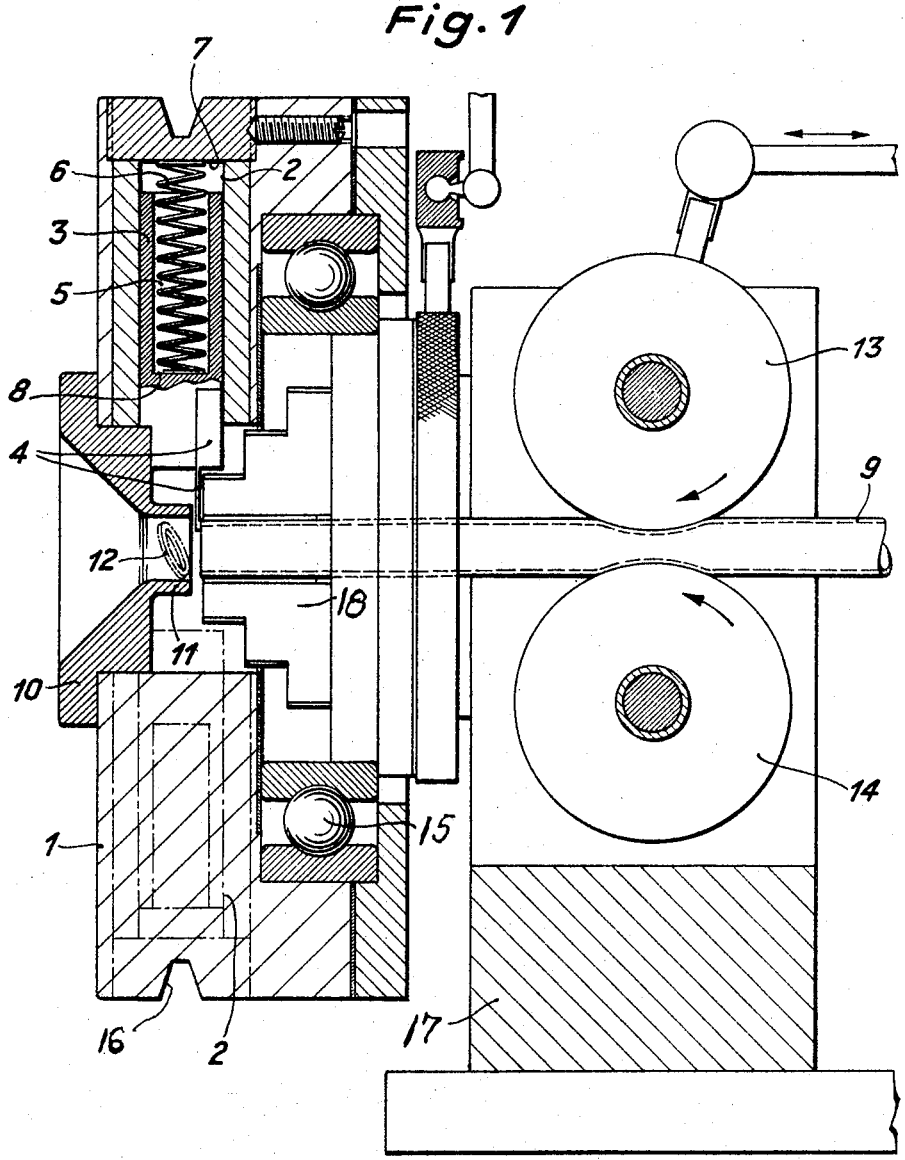

This invention relates to a machine for the production of rings, discs or washers made from tubes, especially tubes made of an elastic raw material, such as rubber or synthetic materials as elastic as rubber.

Machines have been known on which the hose-shaped bodies, consisting of an elastic raw material, are cut into rings. For this purpose, the tubes are arranged on cylindrical mandrils and are brought into contact with knives, which separate one after the other annularly-shaped or disc-shaped sections from the starting body of material. As a rule, in this method of operation, the tube, which is placed into fast rotation by the mandril, advances step by step.

Machines of tihs type, however, are often expensive and they partly require an extensive preparation for the job. Also, the speed of operation is not satisfactory and a higher output of finished parts would only be possible of achievement by additional devices, which would make the machines more expensive. On the other hand, in the case of these ring or disc-like shapes, very great requirements as to precise adherence to measurements are made, especially when these parts are to be used for sealing purposes. Beside that, a faultless cut with a smooth separating surface is indispensable, especially for purposes of sealing.

It is an object of this invention to simplify the known machines and installations and to make them cheaper. Furthermore, a large output of finished parts with great precision as to maintaining dimension and shape should be acheved. Within the framework of the task of this invention, the goal is achieved as to the connection of the cutting machine to the tube-shaping machine for the purpose of production of the continuous feed movement of the workpiece.

Correspondingly, the invention essentially consists in that the separation of the rings or discs from a tube or strand-shaped workpiece, are advanced continuously, taking place by means of a cutting tool, which can be radially adjusted through the effect of centrifugal force.

In a special embodiment of this invention, the adjustable cutting tool has been arranged in a radial bore of a rotatable housing which can be influenced by a changing speed of rotation, revolutions per minute.

After a further characteristic of the invention, the radially adjustable cutting tool is under the influence of a pressure spring, in order to place the tool, by the force of said spring and, in the case of a decreasing speed of the housing, into cutting position in opposition to the now diminished centrfugal force.

Furthermore, according to the invention, provision has been made to develop the knife carrier of the cutting tool as a cylindrical hollow body and to arrange a separating knife at that end thereof which is located on the inside of the housing.

According to other characteristics of the invention, the hollow space of the cutting tool serves for the reception of a pressure spring. In this manner, the hollow space, created by special development of the cutting tool, is utilized in a constructionally favorable manner for housing of the pressure agent, in this case of a pressure spring.

In order to achieve a secure guiding of the workpiece, in the housing which, for example, can be driven by means of a flywheel, a central bearing, equipped with a bore therethrough, has been arranged. For practical purposes, this bearing may also consist of a multi-jaw chuck. As a result thereof, it will be possible to adapt the guiding of the workpiece more simply to the various sizes of cross sections of the workpieces.

It is, furthermore, a further object of the invention, to bring about the feeding of the workpiece to the cutting installation by means of a transportation device located in front of the driven housing. As a result thereof it will be possible to control the advance required each time in relation to the operating speed of the machine.

A still further object of the invention consists in the feed of the workpiece to the cutting installation directly under the effect of the output force of the shaping machine. At the same time, the usual extruders serve, as a rule, as shaping machines for hose and strand-shaped workpieces. In this manner, the housing of the machine containing the cutting device can be attached to the shaping machine, thereby excluding a special transportation installation. The elimination of a transportation installation is an essential advantage in view of the simple construction, the favorable arrangement of space of the cutting machine, as well as an aid for its operation.

In order to achieve a discharge of the finished shapes without any disturbances, the centrifugal force housing has on its front side a funnel-shaped insert.

Further objects will be apparent from the following description when considered in connection with the accompanying drawings in which:

FIGURE 1 is a longitudinal section showing the cutting machine with the transportation installation located in front thereof, in longitudinal section, and FIG. 2 is an end elevation of a portion of the machine.

The cutting machine, according to the invention, consists of a housing 1, which is driven by a suitable means, for example, a flywheel. In the sense of this invention, the drive has been regulated in such a manner, that the housing 1 will rotate with continuously changing revolutions per minute adapted to a certain operational rhythm of the machine. The housing 1 has a radial bore 2 into which, from the inside, a cylindrical hollow body 3 has been inserted. This hollow body or keeper 3 forms the carrier of the separating knife 4 and has been shorter dimensioned than the length of the housing bore 2, so that the knife carrier can move to and fro in the housing bore in a radial direction. In the cylindrical hollow space 5 of the knife carrier 3, a pressure or compression spring 6 has been arranged which is supported, on the one hand, by the inside wall 7 of the housing 1 and, on the other hand, by the bottom 8 of the knife carrier. In the case of an increasing rotational speed of the housing 1, the knife carrier 3 is moved, therefore under the effect of the increasing centrifugal force counter to the force of the spring 6, into the outside edge position of the bore and, thus, the separating knife 4 is taken out of cutting position, so that the tube-shaped workpiece 9 can be moved forward. As soon as the workpiece will have reached the predetermined cutting position, the rotational speed of the housing is again reduced, and the knife carrier will move under the effect of the pressure spring 6 centrally and while overcoming the declining centrifugal force, again into the inside end position, so that the cutting knife 4 again reaches the cutting position. This change takes place in an operating rhythm which is adapted to the present advance speed of the workpiece. In order to balance out the mass forces, an additional bore may be provided in the housing, if need be, in a radially opposed direction, which bore would serve to receive a second hollow cylinder, which is also under spring action, whereby said hollow cylinder, however, will not carry a knife but merely serve as a counterbalance.

At the front side of the housing 1, furthermore, a funnel-shaped insert 10 has been attached, which extends, together with a casing-like continuation or neck portion 11 immediately up to the cutting position of the knife 4, and which serves for the reception or the discharge funnel of the finished rings 12.

FIG. 1 shows a conveying device placed before the cutting machine, which consists essentially of two driving discs 13 and 14, arranged perpendicularly one above the other and at a distance from one another. Since the tube-shaped workpiece 9 does not need to be placed on a mandril, as is the case with known machines, the distance between the discs 13 and 14, driven in any desired manner, can be kept smaller than the outside diameter of the hose 9. In this way, the workpiece is easily pressed-in and carried along by the edges of the discs, so that a continuous advance will be guaranteed.

As shown in FIG. 1 the housing 1, cutter 4, spring 5, carrier 3, funnel 10 and neck portion 11 may rotate as a unit on a ball bearing 15 driven by a V-belt drive in pulley 16. The unit may be mounted by any suitable means on a support 17. The central part 18 within the ball bearing 15 is stationary together with the base 17.

I claim:
1. A machine for producing discs and washers from a length of material comprising a support, a bearing mounted on the support, a housing mounted to rotate on the bearing, a cutting tool slidably radially in the housing and spring urged toward the center where the material is fed into the housing, and means to rotate the housing at slow speed to permit the cutting tool to cut off a section of material and when the housing is rotated at high speed the centrifugal force will overcome the spring to force the tool radially away from the material to feed another section into the housing.

2. A machine according to claim 1, in which means are provided on the support to intermittently feed the material into the housing.

3. A machine according to claim 1, in which a funnel-shaped member with a collar is mounted on the housing to receive the cut-off sections and guide them out of the machine.

4. A machine according to claim 1, in which means are provided on the support to intermittently feed the material into the housing, said last-mentioned means including at least two discs to contact and feed the material into the housing.

5. A machine according to claim 1, in which a hollow cylindrical carrier is provided to which the cutting tool is secured.

References Cited

UNITED STATES PATENTS

| | | | |
|---|---|---|---|
| 1,252,137 | 1/1918 | Mitchell et al. | 82—59 |
| 3,129,621 | 4/1964 | Makowski | 82—59 |

HARRISON L. HINSON, *Primary Examiner.*